US007490179B2

(12) United States Patent
Neyama et al.

(10) Patent No.: US 7,490,179 B2
(45) Date of Patent: Feb. 10, 2009

(54) DEVICE FOR, METHOD OF, AND PROGRAM FOR DYNAMICALLY SWITCHING MODES FOR WRITING TRANSACTION DATA INTO DISK

(75) Inventors: Ryoh Neyama, Yokohama (JP); Yohsake Ozawa, Fujisawa (JP); Gaku Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 11/517,684

(22) Filed: Sep. 8, 2006

(65) Prior Publication Data

US 2007/0266197 A1 Nov. 15, 2007

(30) Foreign Application Priority Data

Sep. 9, 2005 (JP) .............................. 2005-262155

(51) Int. Cl.
*G06F 3/00* (2006.01)
*G06F 13/00* (2006.01)
(52) U.S. Cl. ......................................... 710/52; 710/61
(58) Field of Classification Search .................. 710/52, 710/61
See application file for complete search history.

(56) References Cited

U.S. PATENT DOCUMENTS 5,089,958 A * 2/1992 Horton et al. .................. 714/5
6,192,432 B1 * 2/2001 Slivka et al. .................. 710/68
2006/0117143 A1 * 6/2006 Emerson et al. ............. 711/128

FOREIGN PATENT DOCUMENTS

| JP | 07-072980 | 3/1995 |
|---|---|---|
| JP | 09-093265 | 4/1997 |
| JP | 09-146835 | 6/1997 |

\* cited by examiner

*Primary Examiner*—Henry W. H. Tsai
*Assistant Examiner*—Hyun Nam
(74) *Attorney, Agent, or Firm*—Lisa Yamonaco; Anne Vachon Dougherty

(57) ABSTRACT

A data writing device capable of dynamically switching between a write-through mode and a write-behind mode for writing transaction data into a disk including: a memory with a queue management table for managing a write disk queue and a write memory queue to store the transaction data; means for registering the write memory queue in the table when load exceeds a predetermined threshold value, and for deleting the write memory queue in the table when the load is below the predetermined threshold value; means for receiving the transaction data stored in the write disk queue, and writing the received transaction data into the disk; and means for receiving the transaction data stored in the write disk queue, and writing the received transaction data into a redundant memory.

20 Claims, 8 Drawing Sheets

DEVICE FOR, METHOD OF, AND PROGRAM FOR DYNAMICALLY SWITCHING MODES FOR WRITING TRANSACTION DATA INTO DISK

BACKGROUND OF THE INVENTION

The present invention relates to a device for, a method of and a program for writing transaction data into a disk. The system, the method and the program are capable of, in online transaction processing (OLTP) and the like, dynamically switching modes for writing transaction data into a disk, depending on dynamic variations in load and on a failure in a process and hardware, between a write-through mode and a write-behind mode.

In an online transaction processing application such as a securities transaction system, it is not allowed to lose committed data due to a failure. Normally, as a method of guaranteeing data durability against a failure, a write-through mode by which data are directly written into a disk at the time of commitment is used.

Conventionally, because writing data into a disk generally involves high latency and a low throughput, a write-behind mode has been used as a technique for improving the above problems. FIG. 1 concisely illustrates data write processing in the write-behind mode. In the write-behind mode, first of all, data are made redundant at the time of commitment by temporarily copying the data in a memory (e.g., remote memory) located on a different node or a different process (101). A location and a configuration of the remote memory into which the data are copied depend on what kinds of failures are desired to be endured. After the completion of the commitment, data on a memory in a local process (local memory) are asynchronously written into a disk (102). Even when a failure occurs before the data are written into the disk, the data can be restored from the remote memory (103). Upon completion of writing the data into the disk, the data is deleted from the local memory and the remote memory (104). Since a memory has a higher data writing rate than a disk, the application can reduce latency and improve a throughput.

However, it has been a common practice that data durability guarantee, which is to switch modes between a write-through mode and a write-behind mode, is statically set up prior to activation of an application. In that practice, it has been impossible to dynamically switch the modes therebetween in response to a change in load or a failure in either a process or hardware during execution of the application.

Japanese Patent Application Publication No. Hei9-93265.

Using a remote memory, instead of a disk, as a storage for data at time of commitment, makes it possible to improve latency of the transaction data while guaranteeing durability thereof. However, a memory is expensive as compared with a disk, and hence results in a small capacity. Therefore, in the write-behind mode, if more than a certain amount of committed data is accumulated in a memory within a certain time period, a used capacity of the memory reaches a limit thereof. Thereby, it becomes impossible to additionally save committed data. As a result, the data overflows the memory. On the other hand, if the transaction data are configured to wait for being written into a disk for the purpose of preventing this, write disk processing becomes a bottle neck.

SUMMARY OF THE INVENTION

For the purpose of solving the above problems, the present invention provides a device for writing transaction data into a disk, the device being capable of dynamically switching, between the write-through mode and the write-behind mode, modes for writing transaction data into a disk. The device is provided with a memory including a queue management table for managing a write disk queue and a write memory queue which store the transaction data. Additionally, the system includes means for registering the write memory queue in the queue management table on condition that load exceeds a predetermined threshold value, and for deleting the write memory queue in the queue management table on condition that the load is below the predetermined threshold value. Furthermore, the system includes: means for receiving the transaction data stored in the write disk queue, and writing the received transaction data into the disk; and means for receiving the transaction data stored in the write memory queue, and writing the received transaction data into a redundant memory. The device makes it possible to dynamically switch, between the write-through mode and the write-behind mode, modes for writing transaction data into a disk in response to load, thereby making it possible to efficiently utilize resources of a system.

BRIEF DESCRIPTION OF THE DRAWINGS

For a more complete understanding of the present invention and the advantage thereof, reference is now made to the following description taken in conjunction with the drawings in which.

DETAILED DESCRIPTION OF THE PREFERRED EMBODIMENT

Although the present invention will be described by way of embodiments of the invention, the following embodiments do not limit the invention according to the scope of claims. Additionally, some of combinations of characteristics described in the embodiments are provided for the purpose of facilitating the understanding of a content of the invention, and therefore, not all of the combinations thereof are essential in solving means of the invention.

Although a method or a system will be mainly described in each of the following embodiments, the present invention can be carried out as a program usable on a computer as will be apparent to those skilled in the art. Accordingly, the present invention can assume any one of an embodiment configured as hardware, an embodiment configured as software, and an embodiment configured as a combination of software and hardware. The program can be recorded in an arbitrary computer-readable medium such as a hard disk, a CD-ROM, an optical storage device, a magnetic storage device, or the like.

Figure 1:
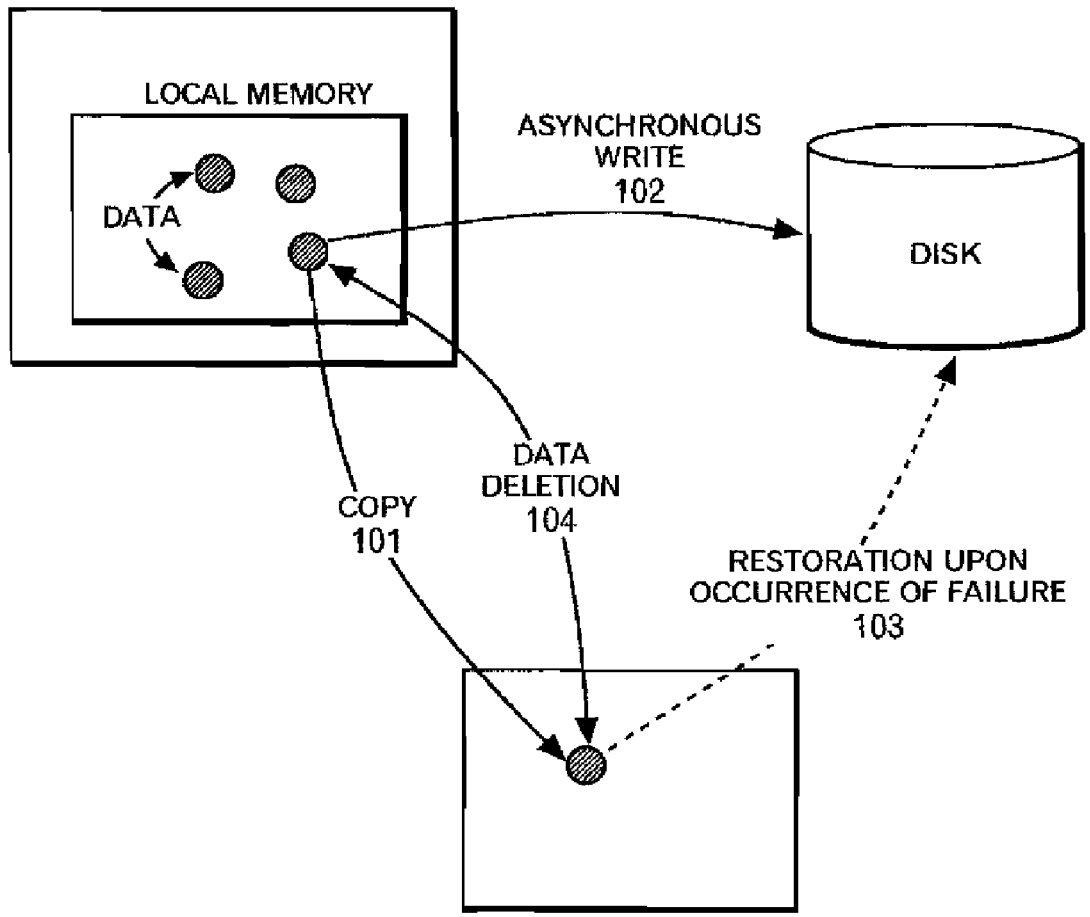
FIG. 1 concisely shows data write processing in a write-behind mode.
Figure 2:
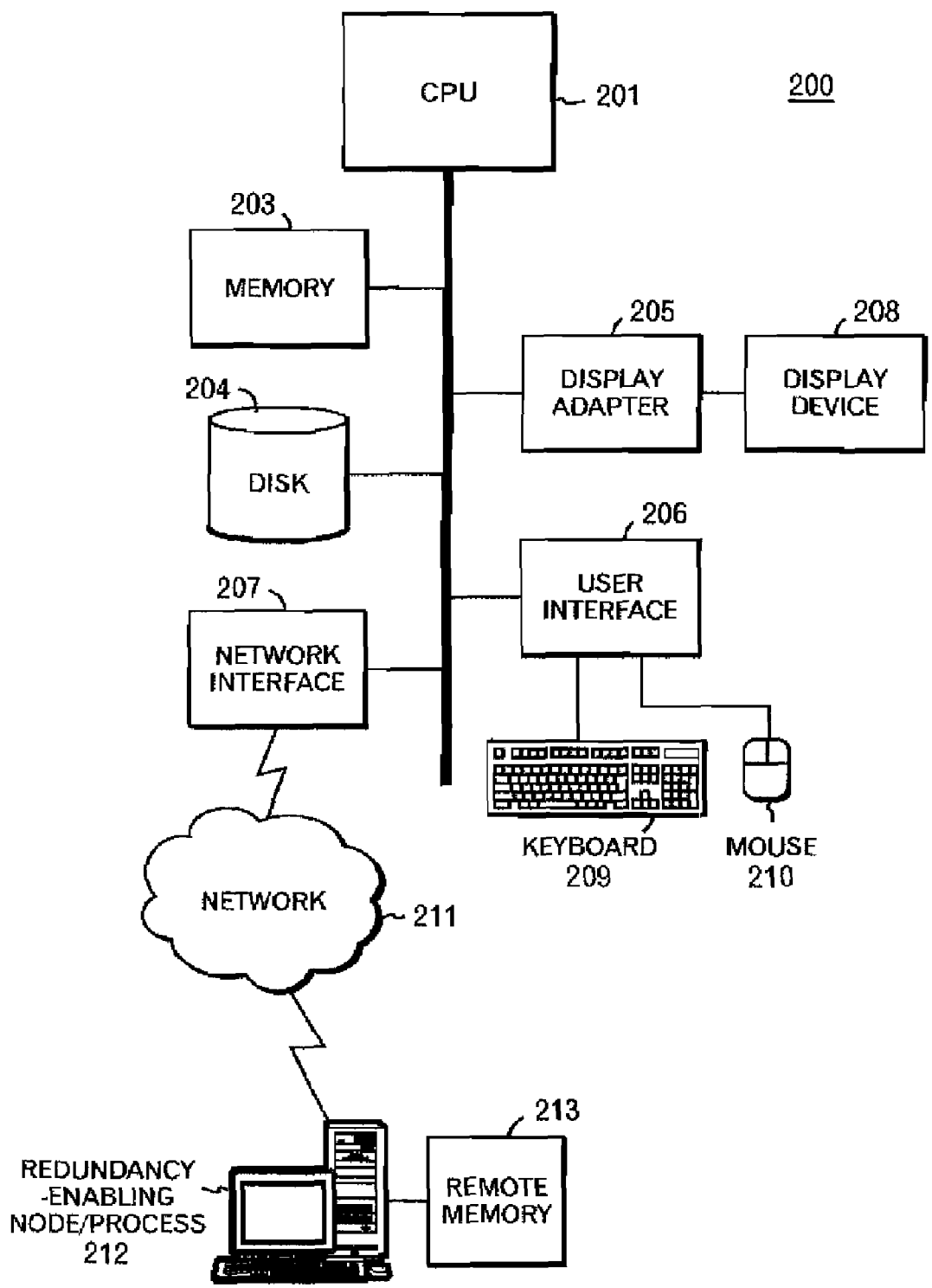
FIG. 2 shows one example of a hardware configuration diagram whereby a system, which dynamically switches modes for writing transaction data into a disk between a write-through mode and the write-behind mode, operates.

FIG. 2 shows an outline of a hardware configuration 200 by which a system, which dynamically switches modes for writing transaction data into a disk between the write-through and write-behind modes, depending on variations in load and on a failure in a process or hardware, is operated. A CPU 201, which is a central processing unit, executes various programs under the control of various operating systems. The CPU 201 is connected to a memory 203, a disk 204, a display adapter 205, a user interface 206 and a network interface 207 through a bus 202. The disk 204 includes software, an operating system, a database system and the like which are operable to enable a computer to function as a system operable to realize the present invention.

The CPU 201 is connected to a keyboard 209 and a mouse 210 through the user interface 206, is connected to a display device 208 through the display adapter 205, and is connected to a network 211 through the network interface 207. The CPU 201 is further connected to a redundancy-enabling node/process 212 through the network 211. The redundancy-enabling node/process 212 includes a remote memory 213. For the purpose of guaranteeing durability of transaction data by using the write-behind mode, this remote memory 213 makes transaction data in the memory 203 redundant and holds the data, the data having been committed and having not yet been reflected in the disk 240. This hardware configuration 200 is nothing more than an example of one embodiment configured of a computer system, a bus arrangement and a network connection. Characteristics of the present invention can be realized in an embodiment formed of various system configurations each including a plurality of identical constituting elements, or in an embodiment where the various system configurations are further distributed on a network.

Figure 3:
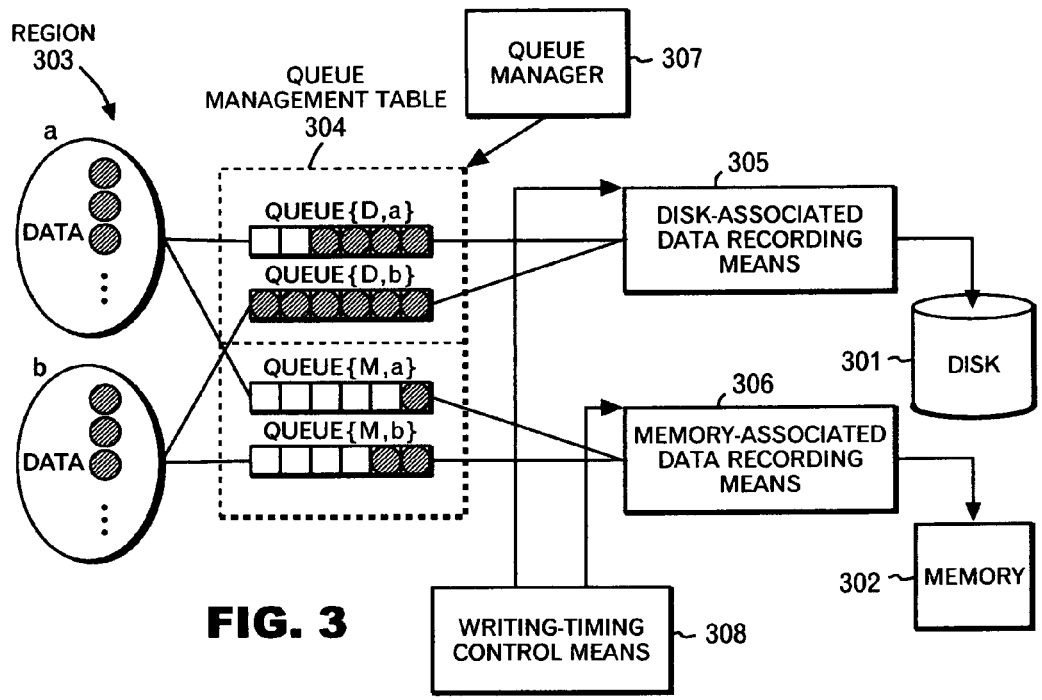
FIG. 3 shows one example of functions of, and data processed in, a device for dynamically switching modes for writing transaction data into a disk between a write-through mode and a write-behind mode.

FIG. 3 conceptually illustrates functions of, and data processed in, a device for dynamically switching, between the write-through mode and the write-behind mode, modes for writing transaction data into a disk. Functional blocks and data configurations which are expressed in this drawing can be expressed in smaller units, and can be expressed even in larger units. It is apparent to those skilled in the art that differences among units for expressing these functional blocks and data configurations are not a substantial issue in carrying out the invention. A disk 301 is a device, such as a hard disk, which has a slower data write rate in general, and data in a database and the like are ultimately recorded therein. A memory 302 has a fast write rate as compared with the disk 301, and is used for temporarily making data redundant in a case of writing in the write-behind mode. Since the memory 302 is used for enabling an application to endure a failure, the memory 302 is normally located on a different node or process. A region 303 is a unit with which data durability guaranteeing methods are switched, and any set of data accessed in a certain transaction is inevitably included in a particular region. As for a definition of "a region", entire data can be defined as a region. Otherwise, in a securities transaction system or the like, transaction data for each company can be defined as respective regions. Incidentally, a transaction cannot access data across a border between the regions.

A queue management table 304 is a table for managing a queue containing data at the time of each commitment of transactions. A queue is prepared for each combination of a region and data recording means. In FIG. 3, there are combinations of regions a and b, and of disk-associated data recording means 305 and memory-associated data recording means 306. Accordingly, there are 4 queues: disk-associated queues {D, a} and {D, b}, and memory-associated queues {M, a} and {M, b}. The disk-associated queues {D, a} and {D, b} manage transaction data for writing data into the disk 301, and the memory-associated queues {M, a} and {M, b} manage transaction data for writing data into the memory 301. On the queue management table 304, a queue manager 307 performs registration, deletion, alternation and the like of a queue. The functions of the queue manager 307 may be incorporated as part of writing timing control means 308.

The disk-associated data recording means 305 receives transaction data from the queues {D, a} and {D, b}, and writes the transaction data into the disk 301. The memory-associated data recording means 306 receives transaction data from the queues {M, a} and {M, b}, and writes the transaction data into the memory 302. Each of the queues contains the transaction data themselves, or a pointer indicating a location where the transaction data are recorded. Each of the data recording means 305 and 306 performs data write processing in accordance with these queues. Normally, the queues {M, a} and {M, b} are located on a local memory (the local memory in FIG. 2) of the system. However, it is also possible for these queues to exist in another system. The writing timing control means 308 assigns threads to the disk-associated data recording means 305 and the memory-associated data recording means 306, whereby the data recording means 305 and the memory-associated data recording means 306 each receive the transaction data, and each perform write processing of the transaction data. Additionally, the writing timing control means 308 manages a pool of threads. The writing timing control means 308 assigns threads from this pool to the data recording means 305 and the memory-associated data recording means 306 depending on the necessity. The writing timing control means 308 brings threads, which have become unnecessary, back to the pool. Then, on each of the queues, each process performs data reading and data writing independently from each other. For this reason, each process applies an exclusive lock to each of the queues in order to prevent itself from making errors in data ordering when performing processing.

In the present invention, for the purpose of making the best use of resources of the memory, in write disk processing of transaction data, the memory is configured not to be used when load is at a normal level. The memory is configured to be efficiently used so as to make it possible to process a large amount of data at one time when the system goes into a high-load state from a low-load state. That is, when the load is at a normal level, data write processing is performed in the write-through mode where data accumulation into the memory is not carried out. Thereby, available space of the memory is kept maximum, and thus, it is made possible to increase an amount of data which can be accumulated in the memory at the time of switching to the write-behind mode in the high-load state. Additionally, when a state of the system returns from the high-load state to an average-load state, available space of the memory is increased by switching back to the write-through mode from the write-behind mode in order that the application can endure a high-load state coming next time. Thereby, it is made possible to increase an amount of data which can be accumulated in the memory when the write-behind mode is applied next time.

Additionally, when a failure in the disk has occurred during the write-through mode, there is a case where temporal switching to the write-behind mode is desirable in order not to stop the application. By contrast, when a failure in the remote memory has occurred in the write-behind mode, there is a case where switching to the write-through mode must be carried out similarly in order not to stop the application. For example, there is a case where there occurs a response delay in which a response from the disk, an OS (operating system) which manages the disk, or a database, delays for some reason. In a case where a failure has occurred in a database process, there is also a situation where the database is temporarily unable to respond. Similarly there is a case where, in the write-behind mode, an OS and a process which manage the remote memory come to have high loads, and thereby become unable to respond. In many cases, these failures are eliminated in a short time. Therefore, it is possible to assure a response time for the application if switching between the write-through mode and the write-behind mode is possible when the remote memory or the disk does not respond for more than a predetermined time.

Moreover, there is a need to reflect a difference between data on the remote memory and data on the disk in a case of performing failover where another process replaces the foregoing process when a failure in a process occurs while an application is operating in the write-behind mode. However, supposing that the process having taken over the foregoing one cannot execute a new transaction until after the completion of reflecting the difference, it leads to reduction in usability of the application. Therefore, in a case where usability of the application weighs heavily, it is desirable that, while the difference is being reflected, processing of the application can be immediately started at the same time as the data are being written into the disk in the write-behind mode. In this case, the write-behind mode is kept in use until after the completion of reflecting the difference, and additionally until after the completion of reflecting new data based on transactions after the failover. Furthermore, it is desirable that, after the completion of the processing, switching to the write-through mode be possible depending on the necessity. Note that the failover may be regarded as a response delay in which a response temporality delays.

Moreover, there is a case where the load concentrates on data of a particular kind. For example, in a securities transaction application, there is a case where sales and purchases of a particular stock concentrate in a short time period. For this reason, it is necessary to beforehand have a configuration where switching between the write-through mode and the write-behind mode can be carried out with respect to each kind of data (for example, with respect to each region), such as a stock name used in trading securities.

Figure 4:
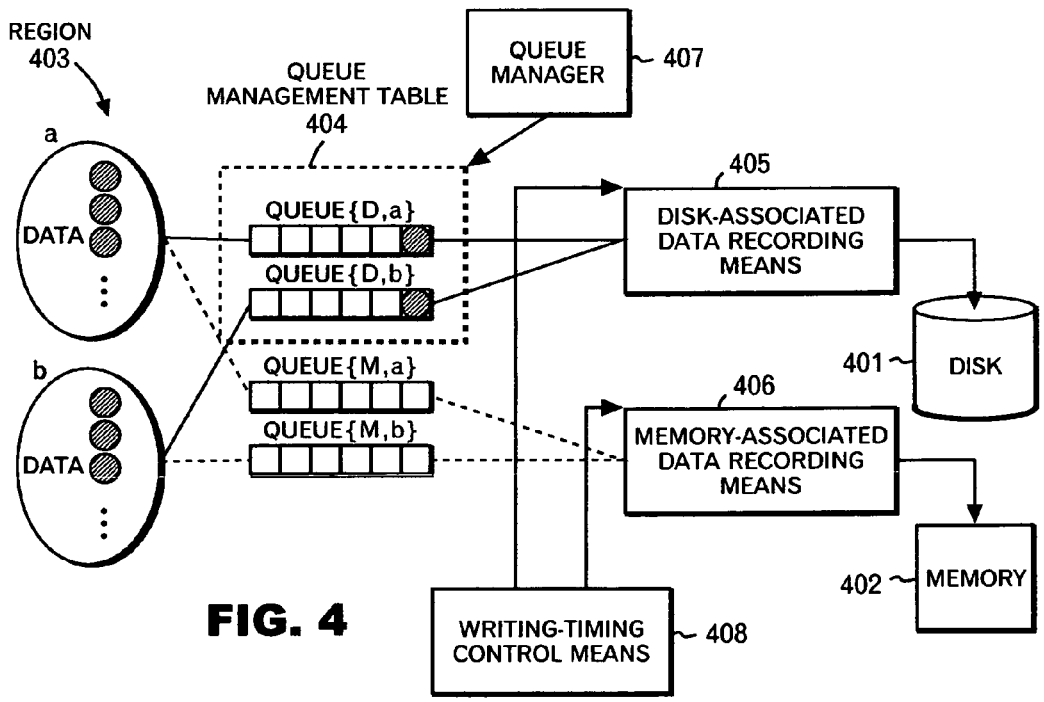
FIG. 4 shows one example of a state where the write-through mode is realized.

FIG. 4 shows one example of a state where the write-through mode is realized by using the configuration shown in FIG. 3. Here, data in regions a and b (403) are written into a disk by a disk-associated data recording means 405. Because the data are written in the write-through mode, a memory-associated data recording means 406 is not used. In a queue management table 404, queues {D, a} and {D, b} respectively for regions a and b used by a disk-associated data recording means 405 are registered. Here, a case where a transaction for the region a is committed will be described as an example. Data of the transaction are stored in the queue {D, a} relating to the region a. In the write-through mode, it is necessary to have the data written into the disk before completion of commitment. For that purpose, writing-timing control means 408 assigns a thread to, and passes the data to, the disk-associated data recording means 405, whereby the disk-associated data recording means 405 writes the data.

The commitment is completed upon completion of the data writing by the disk-associated data recording means 405. Since any two transactions belonging to different regions are not related to each other, the writing-timing control means 408 assigns a thread to the data recording means on a queue to queue basis. Note that, because the data writing is carried out by using the write-through mode in FIG. 4, the disk-associated data recording means 405 may receive data which have not gone through the queue management table 404. However, if data are caused to go through the queue management table 404 even at the time of writing the data in the write-through mode, a functional configuration can be simplified because functions of the writing-timing control means 408 and the disk-associated data recording means 405 can be made common with functions in the write-behind mode. Additionally, if data are caused to inevitably go through a queue in data write processing, it facilitates write processing of data, which remain in the queue, according to the order of the data, even after switching from the write-behind mode to the write-through mode.

Figure 5:
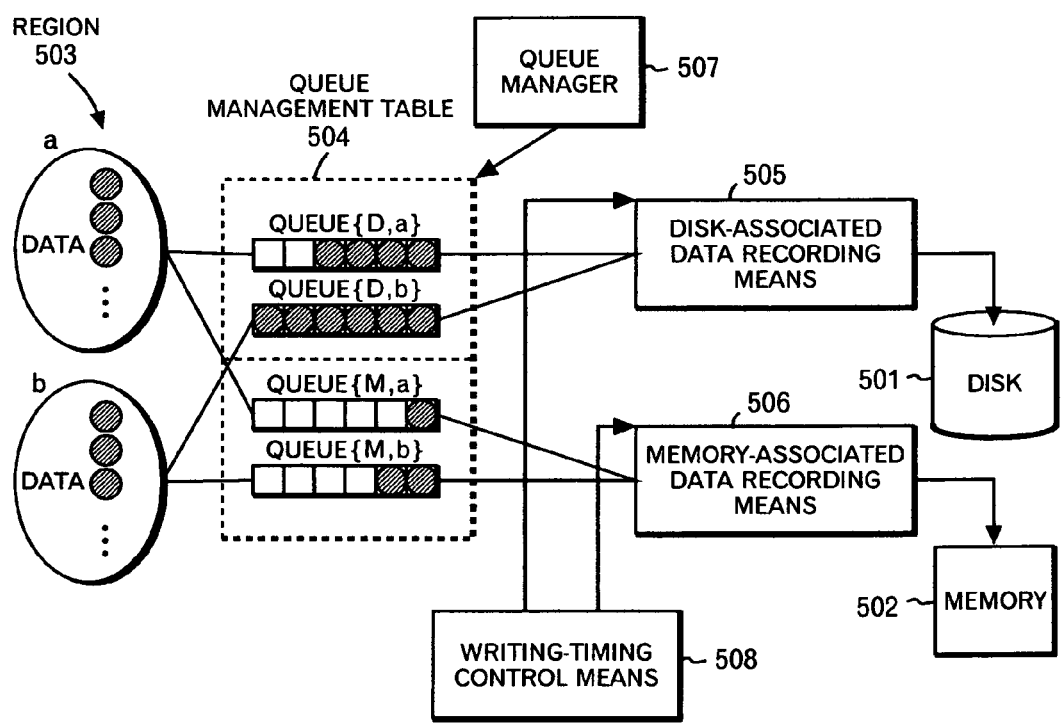
FIG. 5 shows one example of a state where the write-behind mode is realized.

FIG. 5 shows one example of a state where the write-behind mode is realized by using the configuration shown in FIG. 3. Here, data of regions a and b (503) are written into a disk 501 by disk-associated data recording means 505, and into a memory 502 by memory-associated data recording means 506. Accordingly, in a queue management table, there are registered 4 queues which are queues {D, a} and {D, b} for managing data intended to be passed to the disk-associated data recording means 505, and queues {M, a} and {M, b} for managing data intended to be passed to the disk-associated data recording means 506. In writing data in the write-behind mode, it is necessary to have the data written into a redundancy-enabling remote memory (the memory 502) before completion of commitment. Writing-timing control means 508 assigns a thread to the memory-associated data recording means 505.

Transaction data from an application are stored in the queues {M, a} and {M, b}. Commitment processing of the application is completed upon completion of writing the data into the memory 502 by the memory-associated data recording means 505. Thereafter, the writing-timing control means 508 assigns a thread to the disk-associated data recording means 505, and the disk-associated data recording means 505 receives the data and then performs data write processing. Note that, because redundant data become unnecessary once the disk-associated data recording means 505 completes writing of the data into the disk 501, the writing-timing control means 508 issues an instruction to delete the data in the memory 502. In the case of the write-behind mode, since commitment processing on the part of the application only requires completion of write processing into the memory 502, assignment of a thread to the disk-associated data recording means 505 may be carried out before the completion of the commitment. Additionally, processing for deleting data from the memory may be carried out on a transaction to transaction basis, or, may be collectively carried out for a plurality of transactions as batch processing for the purpose of improving performance of the application.

Figure 6:
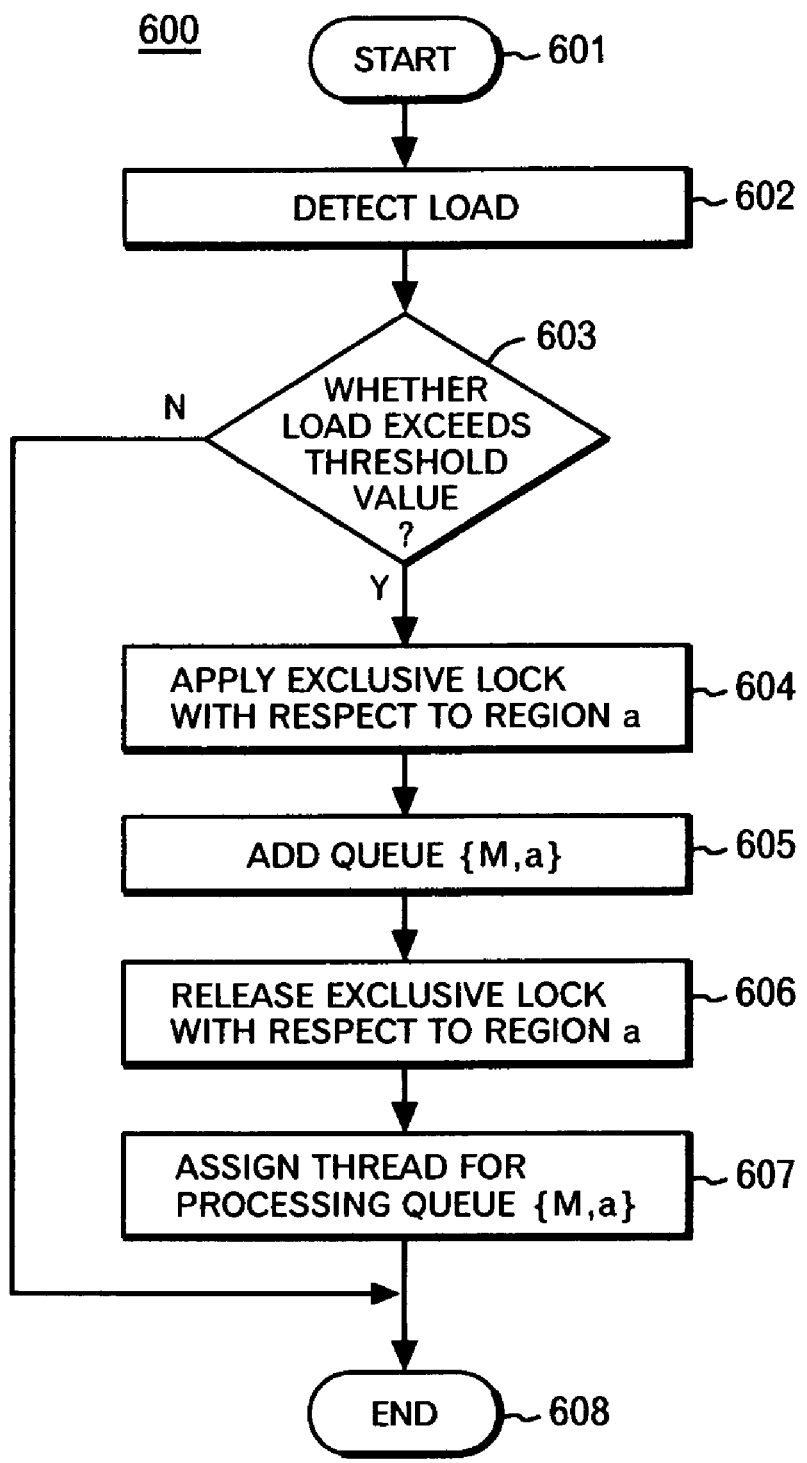
FIG. 6 exemplifies a flow of processing for switching modes for writing data into a disk from the write-through mode to the write-behind mode.

FIG. 6 exemplifies a flow 600 of processing where, with respect to a region a, modes for writing data into a disk are switched from the write-through mode to the write-behind mode. The processing is started in Step 601. Detection of load is carried out in Step 602. Whether or not the load exceeds a predetermined threshold value is judged in Step 603. For example, before write disk processing on a prior transaction is completed, the predetermined threshold values are determined as an amount and a frequency of transactions, the amount and the frequency being at degrees at which a next transaction occurs. This means that a threshold value to the load is determined within a range satisfying demands regarding a throughput and latency of an application. If it has been judged in Step 603 that the load does not exceed the threshold value (No), the processing proceeds to Step 606, where the processing is ended without switching modes for writing data into a disk.

On the other hand, if it has been judged in Step 603 that the load exceeds the threshold value (Yes), the processing proceeds to Step 604. In Step 604, an exclusive lock for which an identifier of the region a is set as a key is acquired with respect to a queue {D, a}. It is also possible to set an object other than an identifier of a region as a key for the exclusive lock. This acquisition of the exclusive lock is carried out for the purpose of preventing the application and data writing means from accessing the queue while data writing modes are being switched from the write-through mode to the write-behind mode, and thus preventing an error from being caused by the accessing. In Step 605, a queue {M, a} is registered in a queue management table. In Step 606, the exclusive lock is released. In Step 607, with regard to queue {M, a}, a thread is assigned to the memory-associated data recording means. However, in Step 607, if an instance of a thread remains, it is not necessary to assign a thread. This processing becomes unnecessary. In Step 608, the switching processing is ended. After the completion of Step 606, a thread is assigned to the memory-associated data recording means, whereby data writing in the write-behind mode is started.

Incidentally, in Step 603, it may also be assumed that the load exceeds the threshold value in a case where the following are detected: failover where another process replaces the foregoing process when a failure in a process occurs with the application in operation; a temporary response delay of a database; failover of a database; or failover of a disk. In that case, the processing proceeds from Step 603 to Step 604 so as to switch from the write-through mode to the write-behind mode, the modes for writing data into a disk.

Incidentally, as an example where the load can be detected in Step 602, there can be cited a difference reflection at the time of failover of an application. It is necessary to reflect a difference between data on the disk and data on the remote memory in a case of failover where another process replaces the foregoing process when a failure in a process occurs with the application operating in the write-behind mode. However, if completion of the reflection is waited for, it leads to reduction in usability of the application. In response, by using the present invention, it is made possible to write data into a disk in the write-behind mode while the difference is being reflected, and to immediately start processing of the application at the same time. Thereafter, after the completion of reflecting the difference, and additionally, upon completion of reflecting new data of transactions after the failover, switching to the write-through mode may be carried out if necessary.

Additionally, as another example where the load can be detected in Step 602, there can be cited a reaction to a temporary response delay of a database. There is a case where, while data are being written into a database in the write-through mode, a response from the database temporarily becomes delayed for some reason. For the purpose of preparing for this case, it is possible to assure a response time to the application by switching writing modes to the write-behind mode if the database has not responded for more than a predetermined time. Switching back to the write-through mode is possible if the database responds thereafter. Dynamic switching makes it possible to extend an endurable response delay time.

Moreover, as still another example where the load can be detected in Step 602, there can be cited a case where a failover time of a database is concealed. There is a case where, while data is being written into a database in the write-through mode, a database process performs failover because a failure has occurred in the database. Failover of the database normally requires a long time, and the database becomes unable to return a response to the application during the failover. However, if switching to the write-behind mode is similarly carried out by assuming this failover as one form of a response delay, it becomes possible to conceal the failover time of the database against the application. Thereby, usability of the application can be enhanced. Dynamic switching makes it possible to extend an endurable failover time of the database.

Furthermore, as still another example where the load can be detected in Step 602, there can be also cited failover of a disk. When a failure occurs in a file, a database, or a disk itself being in use in the write-through mode or in the write-behind mode, there may be a case where it is necessary to switch a data writing destination to another file or another database. This is realized simply by switching destinations into which the disk-associated data recording means writes the data.

Additionally, detection of load in Step 602 can be performed with respect to each region. For example, when it has been judged that load exceeds the threshold value with respect to a region b, an exclusive lock for which an identifier of the region b is set as a key is acquired in Step 604, and a queue {M, b} is registered in the queue management table.

Figure 7:
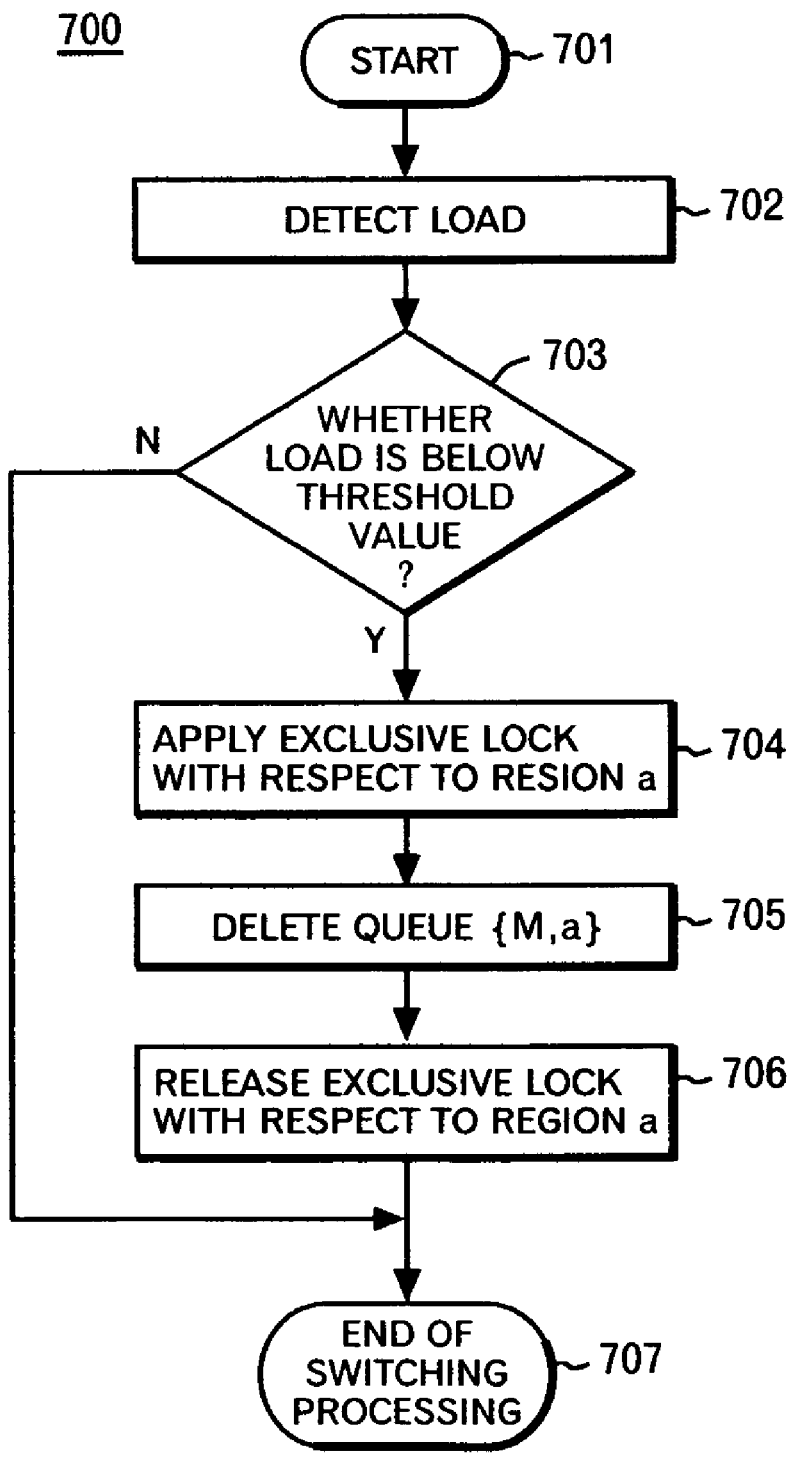
FIG. 7 exemplifies a flow 700 of processing for switching modes for writing data into a disk from the write-behind mode to the write-through mode.

FIG. 7 exemplifies a flow 700 of processing where, with respect to a region a, modes for writing data into a disk are switched from the write-behind mode to the write-through mode. The processing is started in Step 701. Detection of load is carried out in Step 702. Whether or not the load is below a predetermined threshold value is judged in Step 703. If it has been judged in Step 703 that the load is not below the threshold value (No), the processing proceeds to Step 707, where the processing is ended without switching modes for writing data into a disk. On the other hand, if it has been judged in Step 703 that the load is below the threshold value (Yes), the processing proceeds to Step 704. In Step 704, an exclusive lock for which an identifier of the region a is set as a key is acquired with respect to the queues {D, a} and {M, a}. In Step 705, the queue {M, a} is deleted from the queue management table. In Step 706, the exclusive lock is released. In Step 707, the switch processing is ended.

Figure 8:
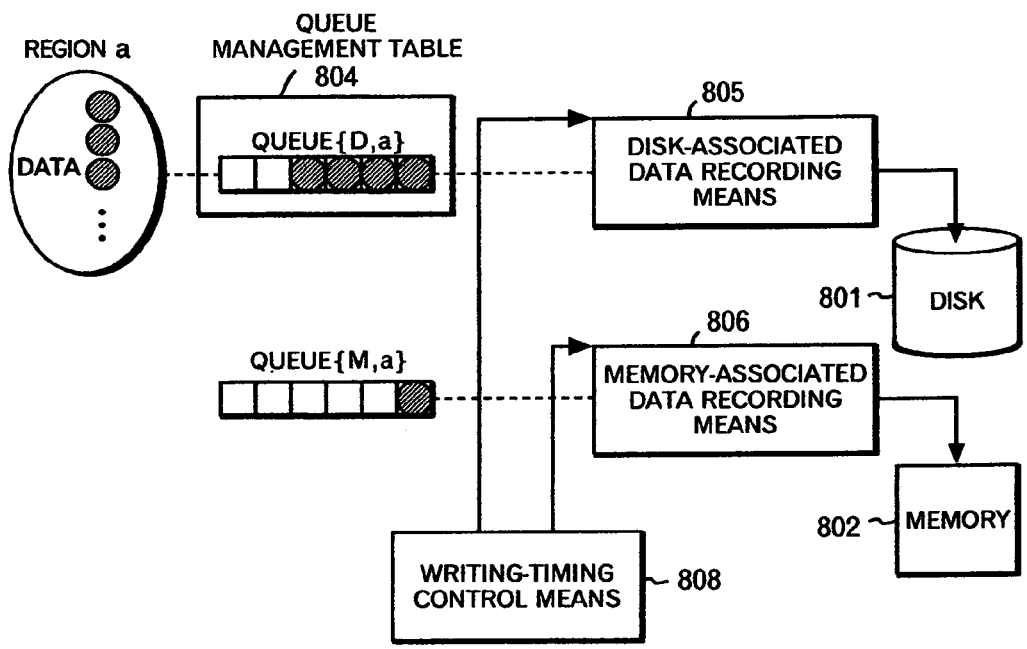
FIG. 8 shows a state where only a registration is left deleted from a queue management table.

Incidentally, in Step 703, the processing may be allowed to proceed to Step 704 so as to switch, from the write-behind mode to the write-through mode, modes for writing data into a disk, also in a case where there has been detected: completion of failover of an application in operation; restoration from a temporary response delay of a database; completion of failover of a database; or completion of failover of a disk. Note that, in Step 705, an instance itself of the queue {M, a} is not deleted, but only a registration thereof into the queue management table is left deleted as shown in FIG. 8. As long as the instance of the queue {M, a} remains, even after the queue {M, a} has been deleted from the queue management table, a thread assigned to memory-associated data recording means can continue data write processing by acquiring, from the queue {M, a}, remaining data to which the write-behind mode has been applied. However, once writing data of the queue {M, a} is completed, it is desirable that the instance be deleted in accordance with resources.

Figure 9:
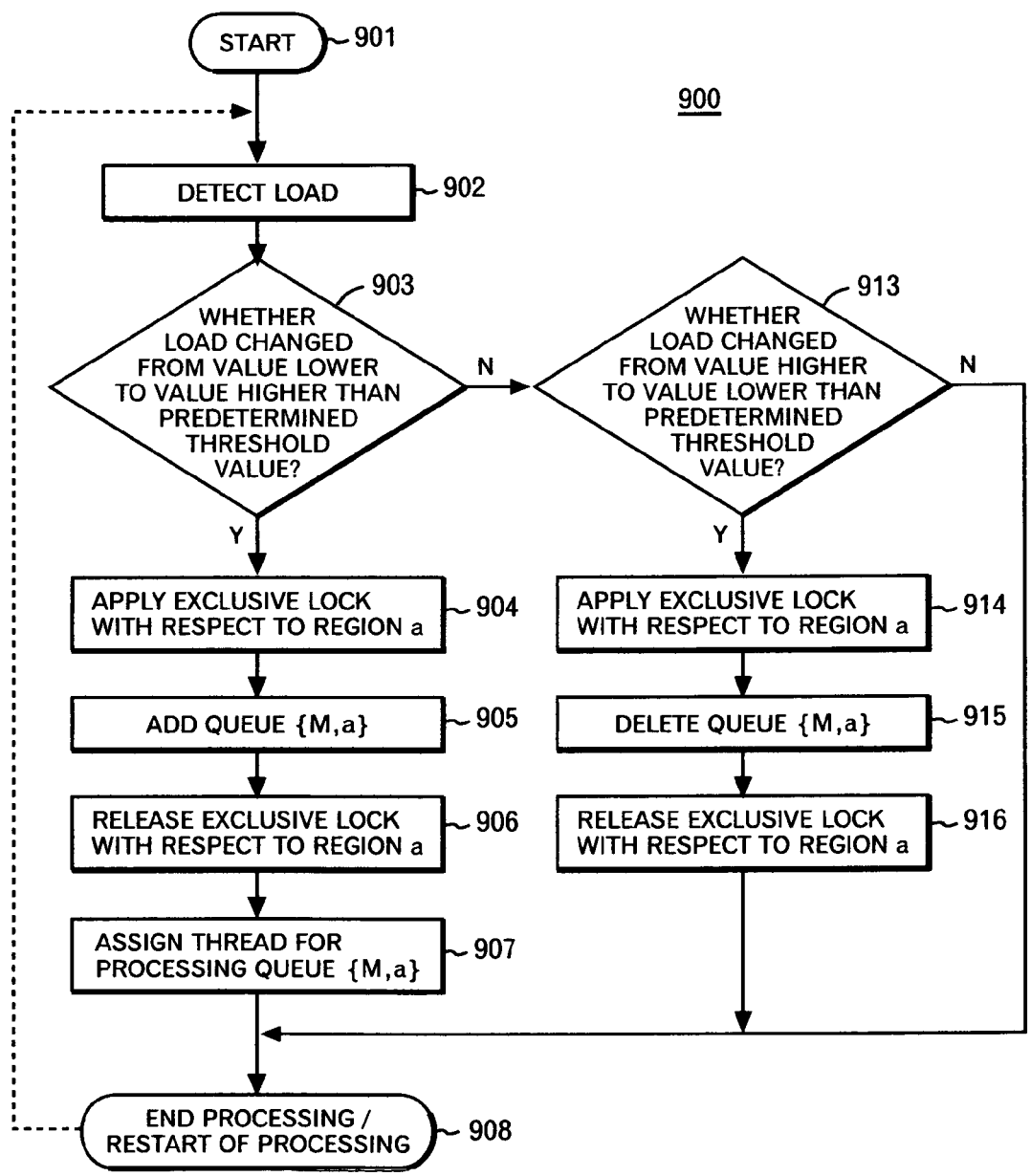
FIG. 9 shows one example of a case where each of the processing in FIGS. 6 and 7 is carried out in the same flow.

FIG. 9 is a flow 900 showing one example of a case where each processing in FIGS. 6 and 7 is carried out in the same flow. Since detection of load in Step 902 can be shared by Steps 602 and 702, the two processing flows can be merged as shown in FIG. 9. Steps 903 and 913 each are processing for judging whether the load is above or below the threshold value. In Steps 903, it is judged whether the load has changed from a value lower to a value higher than the predetermined threshold value. In Steps 913, it is judged whether the load has changed from a value lower to a value higher than the predetermined threshold value. Steps from Step 904 to Step 906 are the same as those from Step 604 to Step 607 in FIG. 6. Steps from Step 914 to Step 916 are the same as those from Step 704 to Step 706 in FIG. 7. Although the processing is ended in Step 908, the processing is restarted at regular time intervals in order to react to a change in the load. The processing returns to Step 902, load is detected again, and the switching processing between the write-through mode and the write-behind mode is started.

Figure 10:
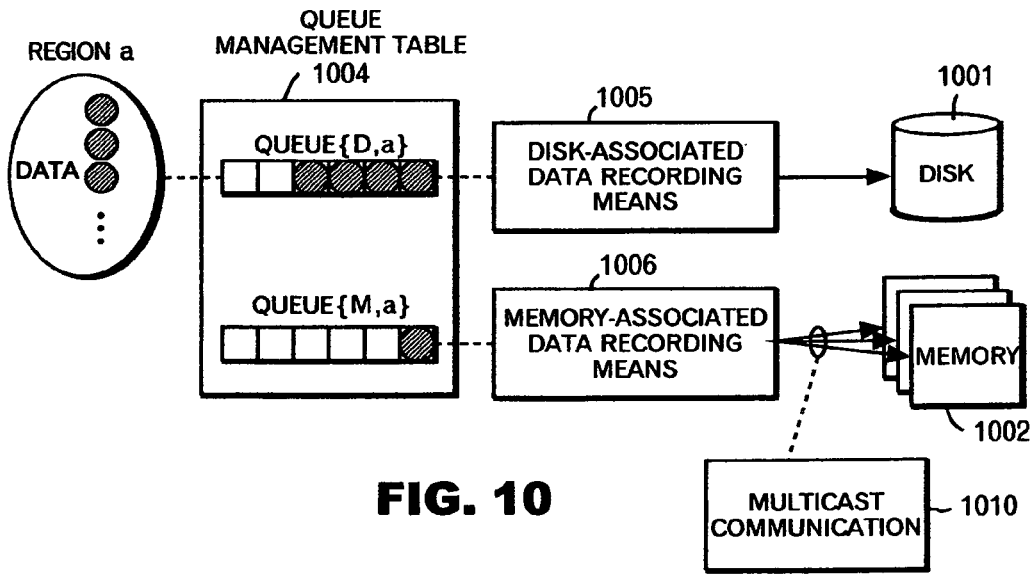
FIG. 10 shows one example of a case where a database and multicast communications are applied to the write-behind mode.

The present invention can be carried out in various embodiments. For example, as shown in FIG. 10, the present invention is applicable to the write-behind mode using a database and multicast communications. A degree of redundancy can be increased by a configuration where: disk-associated data recording means 1005 writes data by having a database 1001 set as a disk, and additionally, a memory-associated data recording means 1006 copies the data into a plurality of remote memories 1002 by using multicast communications 1010. By changing timing of notification, which is provided by the memory-associated data recording means 1006, about the completion of data writing, it is also possible to change a degree of data durability against a failure in the remote memories. For example, in a case where there are three remote memories as copy destinations is 3, it is possible to endure a failure in one remote memory at the maximum, if completion of data writing is reported at the time when copy-completion responses from a predetermined number (for example, the first two) of the remote memories among the three have been received.

Additionally, the present invention is applicable to a case where there is only one region. A case where there is only one region in a system is allowed. In this case, it follows that methods of guaranteeing durability, which are the write-through mode and the write-behind mode, are utilized by uniformly carrying out switching therebetween in an entire system.

The method according to the present invention makes it possible to realize switching between the write-through mode and the write-behind mode which are the methods of guaranteeing data durability. Thereby, in a state where load is so high as to bring about a disk bottleneck, it becomes possible to save usage of a memory in a manner that load is kept within a range limited by the threshold value. As a result, it becomes possible to endure load so high as to exceed the threshold value. Additionally, failure resistance both in the write-through mode and in the write-behind mode can be enhanced, a time taken for failover can be made shorter, and a range of switching the methods of guaranteeing data durability can be defined flexibly.

Hereinabove, while the present invention has been described by using the embodiments, a technical scope of the present invention is not limited to the scope described in the abovementioned embodiments. It is apparent to those skilled in the art that various alterations or modifications can be added to the abovementioned embodiments. Similarly, it is apparent from the description of the scope of claims that embodiments constructed by adding such alterations or modifications to the abovementioned embodiments can also be incorporated in the technical scope of the present invention.

Although the preferred embodiment of the present invention has been described in detail, it should be understood that various changes, substitutions and alternations can be made therein without departing from spirit and scope of the inventions as defined by the appended claims.

What is claimed is:

1. A computer device for writing transaction data into a disk in write-through mode or a disk and a memory in write-behind mode, comprising:
   a queue management table for managing a plurality of queues comprising at least one write disk queue and one write memory queue which store the transaction data;
   queue manager means for obtaining load information and for registering the write memory queue in the queue management table when load exceeds a predetermined threshold value for writing transaction data in write-behind mode, and for deleting the write memory queue in the queue management table when the load is below or equal to the predetermined threshold value for writing transaction data in write-through mode;
   write disk means for receiving the transaction data stored in the write disk queue, and for writing the received transaction data into the disk; and
   write memory means for receiving the transaction data stored in the write memory queue, and for writing the received transaction data into a redundant memory,
   wherein the queue manager means further includes means for applying exclusive locks to the write disk queue and to the write memory queue.

2. The device for writing transaction data into a disk according to claim 1, further comprising write timing control means for managing a plurality of threads into and out of said write disk means and write memory means.

3. The device for writing transaction data into a disk according to claim 1, wherein the write disk queue and the write memory queue exist on a region to region basis.

4. The device for writing transaction data into a disk according to claim 1, wherein the write memory means for writing data into a memory includes multicast generation means for writing the data into a plurality of memories through multicast.

5. The device for writing transaction data into a disk according to claim 4, wherein, upon reception of copy completion responses from a predetermined number of memories, the means for writing data into a memory further includes means for returning a notification about completion of writing the data.

6. The device for writing transaction data into a disk according to claim 1, wherein said means for registering the write memory queue in the queue management table is adapted to register the write memory queue upon occurrence of at least one of: failure in a process of an application, a temporary response delay of a database, a failure in the database, and a failure of a disk.

7. The device for writing transaction data into a disk according to claim 1, wherein write memory means completes writing of transaction data to the memory in write-behind mode before transaction commitment.

8. The device for writing transaction data into a disk according to claim 1, wherein disk memory means completes writing of transaction data to the disk in write-through mode before transaction commitment.

9. The device for writing transaction data into a disk according to claim 1, wherein the queue manager means and the queue timing control means are implemented in a single component.

10. A computer-implemented method of switching, between a write-through mode and a write-behind mode, modes for writing transaction data into a disk, comprising steps of:
  detecting a write load on the disk;
  registering a write disk queue and a write memory queue in a queue management table in response to a change in load from a value lower than or equal to a predetermined threshold to a value higher than a predetermined threshold value for writing transaction data in write-behind mode; and
  deleting the write memory queue in the queue management table in response to a change in load from a value higher than the predetermined threshold value to a value lower than or equal to the predetermined threshold value for writing transaction data in write-through mode,
  and wherein the method further comprises applying exclusive locks to at least one of the write disk queue and to the write memory queue.

11. The method of switching modes for writing transaction data into a disk according to claim 10, further comprising a step of, when a write memory queue is registered and a thread used for processing transaction data in write memory queue has not been assigned, assigning the thread.

12. The method of switching modes for writing transaction data into a disk according to claim 10, wherein the write disk queue and the write memory queue exist on a region to region basis.

13. The method of switching modes for writing transaction data into a disk according to claim 12, further comprising, before the registering step, a step of applying an exclusive lock to the write disk queue of a region corresponding to the queues expected to be registered.

14. The method of switching modes for writing transaction data into a disk according to claim 12, further comprising, before the deleting step, a step of applying an exclusive lock to the write disk queue of a region corresponding to the queues expected to be deleted.

15. The method according to claim 10, wherein registering a write disk queue and a write memory queue in a queue management table is done upon occurrence of at least one of a failure in a process of an application, a temporary response delay of a database, a failure in a database and a failure of a disk.

16. The method according to claim 10, wherein in write-through mode, said writing transaction data to the disk further comprises completing writing before transaction commitment.

17. The method according to claim 10, wherein in write-behind mode, said writing transaction data to a memory further comprises completing writing before transaction commitment.

18. The method according to claim 10, wherein, after registering the write disk queue for write-behind mode, the method further comprises the steps of:
  assigning a thread to a memory associated data recording device;
  writing transaction data into memory;
  commitment processing;
  assigning the thread to a disk associated data recording device;
  writing transaction data to the disk; and
  once all transaction data has been written to the disk, deleting the transaction data from the memory.

19. A program storage device readable by machine tangibly embodying a program of instructions executable by the machine for performing a method for switching, between a write-through mode and a write-behind mode, modes for writing transaction data into a disk, said method comprising the steps of:
  detecting a write load on the disk;
  registering a write disk queue and a write memory queue in a queue management table in response to a change in load from a value lower than or equal to a predetermined threshold to a value higher than a predetermined threshold value for writing transaction data in write-behind mode; and
  deleting the write memory queue in the queue management table in response to a change in load from a value higher than the predetermined threshold value to a value lower than or equal to the predetermined threshold value for writing transaction data in write-through mode,
  and wherein the method further comprises applying exclusive locks to at least one of the write disk queue and to the write memory queue.

20. A method for dynamically determining mode for switching from write-through mode to write-behind mode during computer processing in a system having a disk with at least one associated disk queue, a memory with at least one associated memory queue and a queue management registry comprising steps of:
  obtaining load information;
  comparing load information to a predetermined threshold; and
  when the load information is less than or equal to the predetermined threshold, continuing to operate in write-through mode; and
  when the load information is greater than the predetermined threshold, performing steps to operate in write-behind mode by:
    locking the at least one disk queue;
    adding the at least one memory queue to the queue management registry;
    releasing the lock on the at least one disk queue;
    assigning a thread for the at least one memory queue;
    writing transaction data into memory;
    commitment processing;
    reassigning the thread for the at least one disk queue;
    writing transaction data to the disk; and
    once all transaction data has been written to the disk, deleting the transaction data from the memory.

* * * * *